United States Patent
Bowers

[19]

[11] Patent Number: 6,135,489

[45] Date of Patent: Oct. 24, 2000

[54] TEAR SEAM FOR AIR BAG MODULE COVER

[75] Inventor: Paul A. Bowers, Ray, Mich.

[73] Assignee: TRW Vehicle Safety Systems Inc., Lyndhurst, Ohio

[21] Appl. No.: 09/167,270

[22] Filed: Oct. 7, 1998

[51] Int. Cl.[7] .................................................. B60R 21/16
[52] U.S. Cl. ........................................ 280/728.3; 280/731
[58] Field of Search ................................. 280/728.3, 731

[56] References Cited

U.S. PATENT DOCUMENTS

| | | | |
|---|---|---|---|
| 4,995,638 | 2/1991 | Shinto et al. . | |
| 5,013,064 | 5/1991 | Miller et al. | 280/730.1 |
| 5,320,380 | 6/1994 | Hamada et al. | 280/728.3 |
| 5,330,223 | 7/1994 | Hiramitsu et al. | 280/728.2 |
| 5,499,842 | 3/1996 | Yamamoto et al. | 280/728.3 |
| 5,529,336 | 6/1996 | Eckhout . | |
| 5,685,056 | 11/1997 | Fischer . | |

FOREIGN PATENT DOCUMENTS

| | | | |
|---|---|---|---|
| 5-139231 | 6/1993 | Japan | 280/728.3 |
| 7-329674 | 12/1995 | Japan . | |
| 11-321516 | 11/1999 | Japan . | |

*Primary Examiner*—Paul N. Dickson
*Attorney, Agent, or Firm*—Tarolli, Sundheim, Covell, Tummino & Szabo L.L.P.

[57] ABSTRACT

A vehicle safety apparatus (10) comprises a protection device (12) which is inflatable from a deflated condition to an inflated condition into an occupant compartment of the vehicle to help protect an occupant of a vehicle. The apparatus (10) includes a cover (20) for covering the protection device (12). The cover (20) has an inner side surface (24) and an opposite outer side surface (26) which is exposed to the vehicle occupant compartment. The cover (20) has a predetermined weakened portion (30) which is rupturable upon inflation of the protection device (12) to enable inflation of the protection device into a condition to help protect the vehicle occupant. The predetermined weakened portion (30) of the cover (20) includes an opening (56) in the outer side surface (26) of the cover (20). A member (80) on the outer side surface (26) of the cover (20) overlies the opening (56) in the cover.

24 Claims, 2 Drawing Sheets

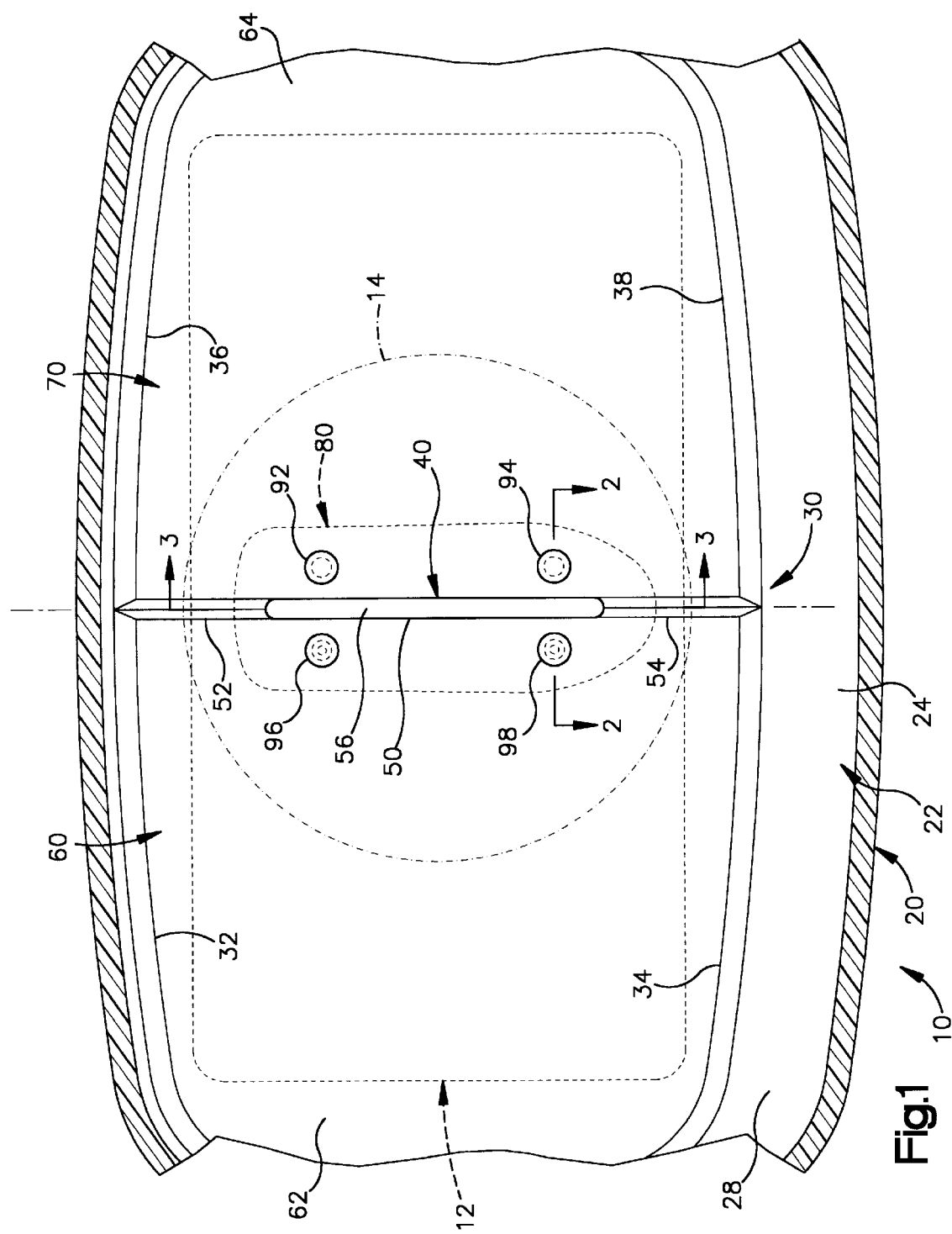

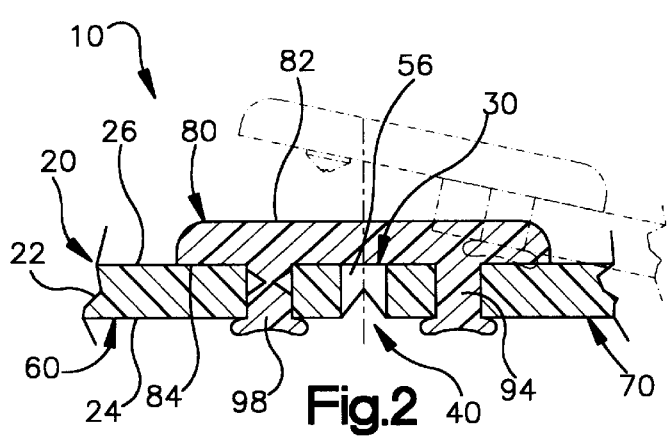
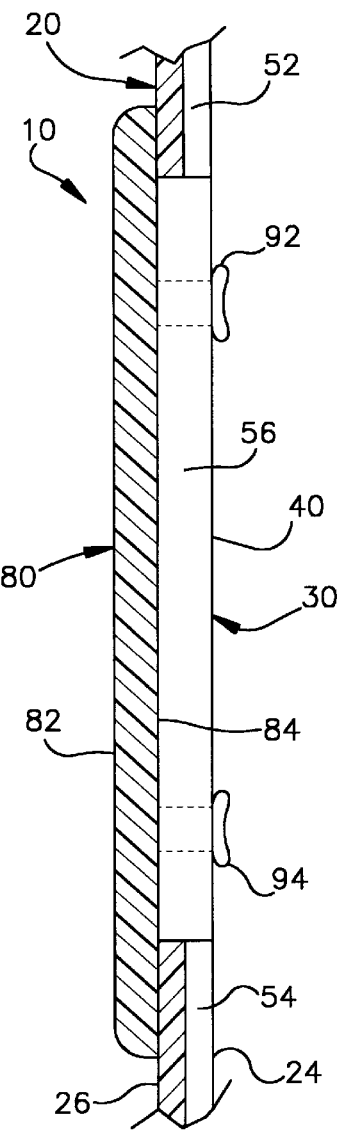
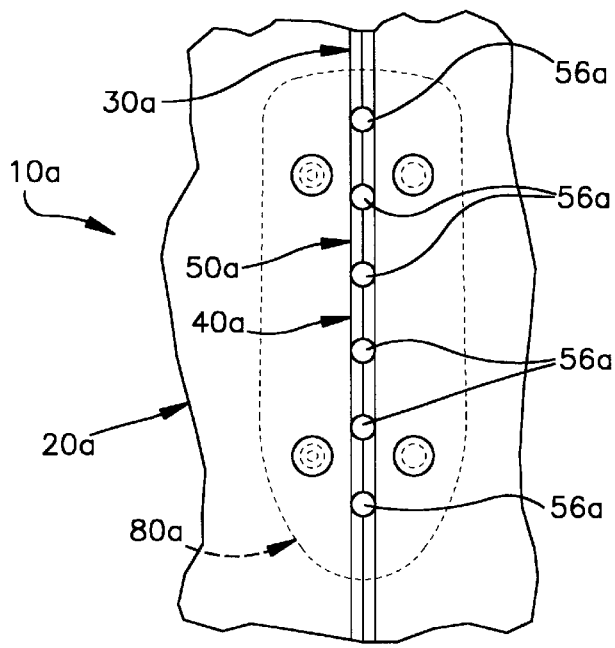
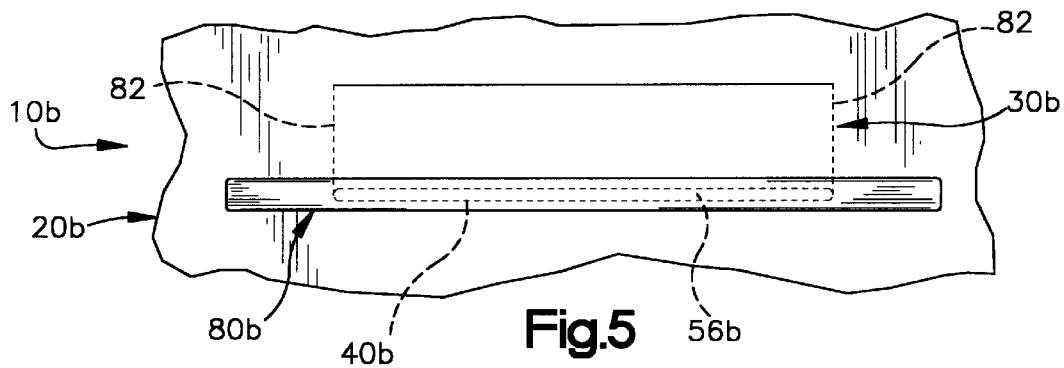

TEAR SEAM FOR AIR BAG MODULE COVER

BACKGROUND OF THE INVENTION

1. Technical Field

The present invention relates to a cover for an air bag module. In particular, the present invention relates to an air bag module cover having a predetermined weakened portion, or tear seam.

2. Description of the Prior Art

A typical air bag module includes an air bag and an inflator. In the event of sudden vehicle deceleration of a magnitude which requires protection of a vehicle occupant, the inflator is actuated to inflate the air bag into a position to help protect the occupant.

The air bag module commonly includes a cover with one or more predetermined weakened portions, or tear seams, to enable the cover to open and allow the air bag to inflate into a position to help protect the occupant. A tear seam typically comprises a groove in the back (inner) surface of the cover. It is desirable that the tear seam be relatively easy to open but at the same time not be visually evident to an occupant of the vehicle.

SUMMARY OF THE INVENTION

The present invention is a vehicle safety apparatus comprising a vehicle occupant protection device which is inflatable from a deflated condition to an inflated condition into an occupant compartment of the vehicle to help protect an occupant of a vehicle. The apparatus includes a cover for covering the protection device. The cover has an inner side surface and an opposite outer side surface which is exposed to the vehicle occupant compartment. The cover has a predetermined weakened portion which is rupturable upon inflation of the protection device to enable inflation of the protection device into a condition to help protect the vehicle occupant. The predetermined weakened portion of the cover includes an opening in the outer side surface of the cover. A member on the outer side surface of the cover overlies the opening in the cover.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic view, partially in section, of an air bag module including a cover having a tear seam in accordance with the present invention, viewed from inside the cover;

FIG. 2 is a partial sectional view of the module of FIG. 1 taken along line 2—2 of FIG. 1;

FIG. 3 is a partial sectional view of the module of FIG. 1 taken along line 3—3 of FIG. 1;

FIG. 4 is a schematic view of a portion of an air bag module in accordance with a second embodiment of the present invention; and FIG. 5 is a schematic view of a portion of an air bag module in accordance with a third embodiment of the present invention.

DESCRIPTION OF PREFERRED EMBODIMENTS

The present invention relates to a cover for an air bag module and, in particular, to an air bag module cover having a predetermined weakened portion, or tear seam. As representative of the present invention, FIG. 1 illustrates an air bag module 10. The air bag module 10 is mounted on a vehicle steering wheel (not shown). The module 10 could alternatively be mounted on a different portion of a vehicle, such as a vehicle instrument panel, a seat, a door, or a vehicle roof adjacent a door.

The module 10 includes an air bag illustrated schematically at 12 in FIG. 1. Other inflatable vehicle occupant protection devices that can be used in accordance with the invention include, for example, inflatable seat belts, inflatable knee bolsters, inflatable head liners or side curtains, and knee bolsters operated by inflatable air bags.

The module 10 also includes an inflator shown schematically at 14 which has one or more fluid outlets for directing inflation fluid into the air bag 12 upon actuation of the inflator. The inflator 14 may be a pyrotechnic inflator which uses the combustion of gas-generating material to generate inflation fluid in the form of gas to inflate the air bag 12. The module 10 alternatively could include an inflator which contains a stored quantity of pressurized inflation fluid, or a combination of pressurized inflation fluid and ignitable material for heating the inflation fluid.

The module 10 includes a cover 20 for enclosing the air bag 12 and the inflator 14. The cover 20 is made from a material which is strong enough to protect the parts of the air bag module 10 which are enclosed within the cover. The material of the cover 20 is sufficiently flexible or deformable so that it can be resiliently deformed inwardly by pressure from an occupant of the vehicle.

The cover 20 has a main body portion 22 which has inner and outer side surfaces 24 and 26 (FIG. 2). The main body portion 22 of the cover 20 includes a fixed part 28 (FIG. 1) of the cover. Fasteners (not shown) such as rivets extend through the fixed part 28 of the cover 20 to secure the cover to the steering wheel or other vehicle portion on which the module 10 is mounted. The air bag 12 when in the deflated condition is packed inside the cover 20, in engagement with the inner side surface 24 of the cover.

An I-shaped tear seam 30 is formed in the main body portion 22 of the cover 20. The tear seam 30 constitutes a weakened portion of the cover 20 which is rupturable under the force of the inflating air bag 12 to enable the air bag to inflate out of the cover. The tear seam 30 includes four side sections 32, 34, 36 and 38, and a linear central or base section 40.

Each one of the four side sections 32–38 of the tear seam 30 comprises a groove formed in the inner side surface 24 of the cover 20. The cover 20 is weakened at the location of the grooves because the material of the cover is thinner at those locations. The grooves do not extend completely through the material of the cover 20, to the outer side surface 26 of the cover. Thus, there are no openings in the outer side surface 26 of the cover, at the location of the four side sections 32–38 of the tear seam 30.

The base section 40 of the tear seam 30 has a central portion 50 and opposite end portions 52 and 54. The end portions 52 and 54 of the base section 40 of the tear seam 30 comprise grooves formed in the inner side surface 24 of the cover 20. The cover 20 is weakened at the location of the grooves because the material of the cover is thinner at those locations. The grooves 52 and 54 do not extend completely through the material of the cover 20 to the outer side surface 26 of the cover. Thus, there are no openings in the outer side surface 26 of the cover 20 at the location of the two end portions 52 and 54 of the base section 40 of the tear seam 30.

The central portion 50 of the base section 40 of the tear seam 30 is formed as an opening 56 in the cover 20. The opening 56 is an elongate slot which extends completely through the cover 20 from the inner side surface 24 to the outer side surface 26. The cover 20 is thereby weakened substantially in the area of the central portion 50 of the base section 40 of the tear seam 30. The cover 20 is weaker in the area of the central portion 50 of the tear seam 30 than at the end portions 52 and 54 of the base section 30 or at the side sections 32–38 of the tear seam.

The tear seam 30 partially defines first and second movable parts 60 and 70 of the cover. Each one of the first and second movable cover parts 60 and 70 has a generally rectangular configuration. The base section 40 and the side sections 32 and 34 of the tear seam 30 extend along three sides of the first movable cover part 60. A first hinge portion 62 of the cover 20 extends along the fourth side of the first movable cover part 60, between the two side sections 32 and 34 of the tear seam 30. The first hinge portion 62 connects the first movable cover part 60 to the fixed cover part 28 for pivotal movement relative to the fixed cover part.

The base section 40 and the other two side sections 36 and 38 of the tear seam 30 extend along three sides of the second movable cover part 70. A second hinge portion 64 of the cover 20 extends along the fourth side of the second movable cover part 70, between the two side sections 36 and 38 of the tear seam 30. The second hinge portion 64 connects the second movable cover part 70 to the fixed cover part 28 for pivotal movement relative to the fixed cover part.

A member in the form of an emblem 80 covers the opening 56 in the cover 30. The emblem 80 may be a decorative emblem which includes indicia such as the name or logo of the vehicle manufacturer, or an SRS ("supplemental restraint system") designation. The emblem 80 (FIGS. 2 and 3) has an outer side surface 82 and an inner side surface 84. The inner side surface 84 of the emblem 80 overlies the outer side surface 26 of the cover. The emblem 80 is longer and wider than the opening 56. As a result, the emblem 80 covers the entire opening 56.

The emblem 80 includes a plurality of fasteners 92–98 for securing the emblem to the cover 20. Two of the fasteners 92 and 94 are solid pins which are located on one side of the base section 40 of the tear seam 30. The pins 92 and 94 extend through openings in the second movable part 70 of the cover 20. End portions of the pins 92 and 94 project past the inner side surface of the second movable part 70 of the cover 20, and are deformed by heating to secure the emblem 80 to the second movable part of the cover.

The other two fasteners 96 and 98 are breakaway pins which are located on the other side of the base section 40 of the tear seam 30. The pins 96 and 98 extend through openings in the first movable part 60 of the cover 20. End portions of the pins 96 and 98 project past the inner side surface of the first movable part 60 of the cover 20, and are deformed by heating to secure the emblem 80 releasably to the first movable part of the cover.

The vehicle includes known means (not shown) for sensing a collision involving the vehicle and for actuating the inflator 14 in response to the sensing of a collision. The means may include a deceleration sensor and vehicle electric circuitry for actuating the inflator 14 in response to sensing a vehicle deceleration indicative of a vehicle collision having a severity greater than a predetermined threshold value.

In the event of a vehicle collision of a magnitude greater than the predetermined threshold value, the sensing means provides an electrical signal over lead wires to the inflator 14. The inflator 14 is actuated in a known manner. Inflation fluid flows out of the inflator 14 and into the air bag 12. The rapidly flowing inflation fluid causes the air bag 12 to inflate in an upward direction as viewed in FIG. 2.

The inflating air bag 12 pushes outward against the inner side surface 24 of the cover 20. The force of the inflating air bag 12 causes the cover 20 to rupture along the tear seam 30, which is the predetermined weakened portion of the cover. The first and second movable parts 60 and 70 of the cover 20 open sufficiently that the air bag 12 inflates into a position to help protect the vehicle occupant. The amount of force required to rupture the tear seam 30 and open the cover 20 is reduced because a part of the tear seam (the central portion 50 of the base section 40) is an opening rather than simply a groove like the remainder of the tear seam. At the same time, the emblem 80 covers the opening 56 and protects the air bag 12 until the inflator 14 is actuated.

As the first and second movable parts 60 and 70 of the cover 20 open, the breakaway pins 96 and 98 on the emblem 80 rupture. The emblem 80 is therefore no longer secured to the first movable part 60 of the cover 20, but only to the second movable part 70 of the cover as shown in dot-dash lines in FIG. 2. The emblem 80 moves with the second movable cover part 70 as the cover 20 opens. The solid pins 92 and 94 retain the emblem 80 on the second movable cover part 70 when the cover 20 opens.

FIG. 4 illustrates portions of an air bag module 10*a* which is constructed in accordance with a second embodiment of the present invention. The air bag module 10*a* is similar in construction to the air bag module 10 (FIGS. 1–2) and similar parts are given the same reference numerals with the suffix "a" added for clarity.

In the air bag module 10*a*, the central portion 50*a* of the base section 40*a* of the tear seam 30*a* comprises a series of discrete openings or perforations 56*a*, rather than one continuous opening as in the air bag module 10. All the individual openings 56*a* are covered by the one emblem 80*a*. The openings 56*a* are configured and located to ensure that the central portion 50*a* of the base section 40*a* of the tear seam 30*a* is still weaker and easier to rupture than the remaining portions of the tear seam 30*a*.

FIG. 5 illustrates portions of an air bag module 10*b* which is constructed in accordance with a third embodiment of the present invention. The air bag module 10*b* is similar in construction to the air bag module 10 (FIGS. 1–2) and similar parts are given the same reference numerals with the suffix "b" added for clarity.

In the air bag module 10*b*, the cover 20*b* forms a part of the instrument panel 80 of a vehicle. The cover 20*b* has a U-shaped tear seam 30*b* including a base section 40*b* and two side sections 82. The base section 40*b* comprises an opening 56*b* in the cover 20*b* which extends for the entire length of the base section. The opening 56*b* is covered by one emblem 80*b* which, in the illustrated embodiment, is a piece of trim such as wood trim.

From the above description of the invention, those skilled in the art will perceive improvements, changes and modifications. For example, the emblem may be a functional device rather than a decorative one. For example, the emblem may comprise a switch or a control or an indicator for one or more vehicle functions such as radio or speed control. Such improvements, changes and modifications within the skill of the art are intended to be covered by the appended claims.

Having described the invention, I claim:

1. A vehicle safety apparatus comprising:

a vehicle occupant protection device which is inflatable from a deflated condition to an inflated condition into an occupant compartment of a vehicle to help protect an occupant of the vehicle;

a cover for covering said protection device;

said cover having an inner side surface and an opposite outer side surface which is exposed to the vehicle occupant compartment;

said cover having a predetermined weakened portion which is rupturable upon inflation of said protection device to enable inflation of said protection device into a condition to help protect the vehicle occupant;

said predetermined weakened portion of said cover including an opening in said outer side surface of said cover; and a member on said outer side surface of said cover, said member overlying said opening in said cover, said opening comprising a series of perforations.

2. A vehicle safety apparatus comprising:

a cover for covering a vehicle occupant protection device which is inflatable from a deflated condition to an inflated condition to help protect a vehicle occupant;

said cover having a predetermined weakened portion which is rupturable due to inflation of the protection device to enable inflation of the protection device into a condition to help protect the vehicle occupant;

said predetermined weakened portion including a first part which is generally invisible from the exterior of said cover and a second part which is visible from the exterior of said cover;

said apparatus further comprising a member covering said second part of said predetermined weakened portion of said cover, said second part of said predetermined weakened portion comprising a series of perforations.

3. A vehicle safety apparatus comprising:

a vehicle occupant protection device which is inflatable from a deflated condition to an inflated condition into an occupant compartment of a vehicle to help protect an occupant of the vehicle;

a cover for covering said protection device;

said cover having an inner side surface and an opposite outer side surface which is exposed to the vehicle occupant compartment;

said cover having a predetermined weakened portion which is rupturable upon inflation of said protection device to enable inflation of said protection device into a condition to help protect the vehicle occupant;

said predetermined weakened portion of said cover including an opening in said outer side surface of said cover; and a member on said outer side surface of said cover, said member overlying both said predetermined weakened portion of said cover and said opening in said cover.

4. An apparatus as set forth in claim 3 wherein said opening comprises an elongate slot.

5. An apparatus as set forth in claim 4 wherein said opening comprises a central portion of a first section of said predetermined weakened portion, said first section including end portions on opposite sides of said central portion, said end portions being free of openings in said outer side surface of said cover.

6. An apparatus as set forth in claim 3 wherein said member is a decorative emblem.

7. An apparatus as set forth in claim 3 wherein said member is a trim piece.

8. An apparatus as set forth in claim 3 wherein said opening at least partially defines first and second relatively movable parts of said cover, said member being fixed to said first movable part of said cover and being releasably secured to said second movable part of said cover.

9. An apparatus as set forth in claim 4 wherein said opening extends through said cover between said inner and outer side surfaces of said cover, said predetermined weakened portion of said cover further comprising grooves which are formed on the inner side surface of said cover and which do not extend to said outer side surface of said cover.

10. A vehicle safety apparatus comprising:

a vehicle occupant protection device which is inflatable from a deflated condition to an inflated condition into an occupant compartment of a vehicle to help protect an occupant of the vehicle;

a cover for covering said protection device;

said cover having an inner side surface and an opposite outer side surface which is exposed to the vehicle occupant compartment;

said cover having a predetermined weakened portion which is rupturable upon inflation of said protection device to enable inflation of said protection device into a condition to help protect the vehicle occupant;

said predetermined weakened portion of said cover including an opening in said outer side surface of said cover; and a member on said outer side surface of said cover, said member overlying said opening in said cover, said member including a plurality of fasteners, at least one of said fasteners being a fastener that breaks upon inflation of said vehicle occupant protection device.

11. An apparatus as set forth in claim 10 wherein said opening comprises an elongate slot.

12. An apparatus as set forth in claim 11 wherein said opening comprises a central portion of a first section of said predetermined weakened portion, said first section including end portions on opposite sides of said central portion, said end portions being free of openings in said outer side surface of said cover.

13. An apparatus as set forth in claim 10 wherein said member is a decorative emblem.

14. An apparatus as set forth in claim 10 wherein said member is a trim piece.

15. An apparatus as set forth in claim 10 wherein said opening at least partially defines first and second relatively movable parts of said cover, said member being fixed to said first movable part of said cover and being releasably secured to said second movable part of said cover.

16. An apparatus as set forth in claim 11 wherein said opening extends through said cover between said inner and outer side surfaces of said cover, said predetermined weakened portion of said cover further comprising grooves which are formed on the inner side surface of said cover and which do not extend to said outer side surface of said cover.

17. A vehicle safety apparatus comprising:

a cover for covering a vehicle occupant protection device which is inflatable from a deflated condition to an inflated condition to help protect a vehicle occupant;

said cover having a predetermined weakened portion which is rupturable due to inflation of the protection device to enable inflation of the protection device into a condition to help protect the vehicle occupant;

said predetermined weakened portion including a first part which is generally invisible from the exterior of said cover and a second part which is visible from the exterior of said cover;

said apparatus further comprising a member covering both said first part and said second part of said predetermined weakened portion of said cover.

18. An apparatus as set forth in claim 17 wherein said second part of said predetermined weakened portion comprises an elongate slot.

19. An apparatus as set forth in claim 17 wherein said member is a decorative emblem which includes indicia such as the name or logo of the vehicle manufacturer.

20. An apparatus as set forth in claim 17 wherein said second part of said predetermined weakened portion at least partially defines first and second relatively movable parts of said cover, said member being fixed to said first movable part of said cover and being releasably secured to said second movable part of said cover.

21. A vehicle safety apparatus comprising:

a cover for covering a vehicle occupant protection device which is inflatable from a deflated condition to an inflated condition to help protect a vehicle occupant;

said cover having a predetermined weakened portion which is rupturable due to inflation of the protection device to enable inflation of the protection device into a condition to help protect the vehicle occupant;

said predetermined weakened portion including a first part which is generally invisible from the exterior of said cover and a second part which is visible from the exterior of said cover;

said apparatus further comprising a member covering said second part of said predetermined weakened portion of said cover, said member including a plurality of fasteners, at least one of said plurality of fasteners being a fastener that breaks upon inflation of said vehicle occupant protection device.

22. An apparatus as set forth in claim 21 wherein said second part of said predetermined weakened portion comprises an elongate slot.

23. An apparatus as set forth in claim 21 wherein said member is a decorative emblem which includes indicia such as the name or logo of the vehicle manufacturer.

24. An apparatus as set forth in claim 21 wherein said second part of said predetermined weakened portion at least partially defines first and second relatively movable parts of said cover, said member being fixed to said first movable part of said cover and being releasably secured to said second movable part of said cover.

* * * * *